United States Patent [19]

Shoemaker

[11] 4,251,352
[45] Feb. 17, 1981

[54] INCLINED SEPARATION SCREEN FOR AGITATION TANK

[75] Inventor: Robert S. Shoemaker, Burlingame, Calif.

[73] Assignee: Bechtel International Corporation, San Francisco, Calif.

[21] Appl. No.: 107,809

[22] Filed: Dec. 28, 1979

[51] Int. Cl.³ ............................ B03B 5/02; C22B 3/02
[52] U.S. Cl. ........................................... 209/45; 209/3; 209/250; 266/168
[58] Field of Search ................. 209/1, 3, 4, 45, 46, 209/49, 250; 75/118 R; 266/170, 168

[56] References Cited

U.S. PATENT DOCUMENTS

| | | | |
|---|---|---|---|
| 3,554,516 | 1/1971 | Denny et al. | 266/170 |
| 3,606,290 | 9/1971 | Ransom | 266/170 |
| 4,133,746 | 1/1979 | Dopson | 209/1 |
| 4,173,519 | 11/1979 | Parker et al. | 75/118 R X |

*Primary Examiner*—William A. Cuchlinski, Jr.
*Attorney, Agent, or Firm*—Townsend and Townsend

[57] ABSTRACT

An improvement in the screen circumscribing or partially circumscribing the rim of an agitation tank is disclosed. A screen substantially impermeable to the charcoal is provided which is inclined inwardly at an angle between about 35° and 55° from vertical. The metal-bearing charcoal adhering to the screen is readily washed from the screen by the rolling motion of the mixture in the tank.

12 Claims, 5 Drawing Figures

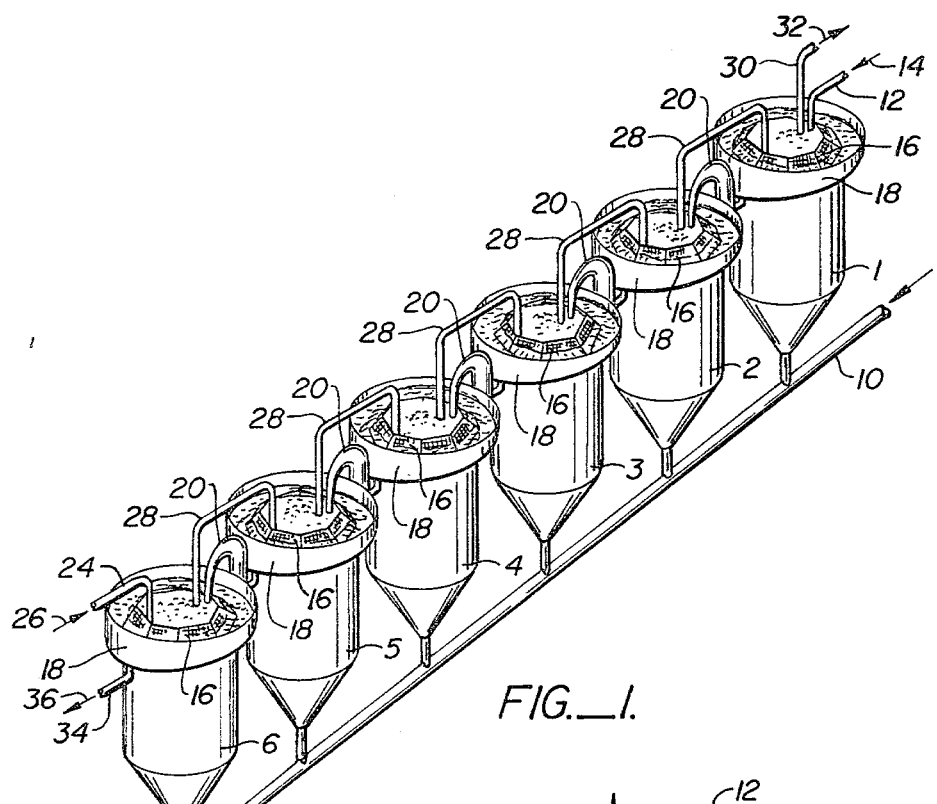
FIG._1.
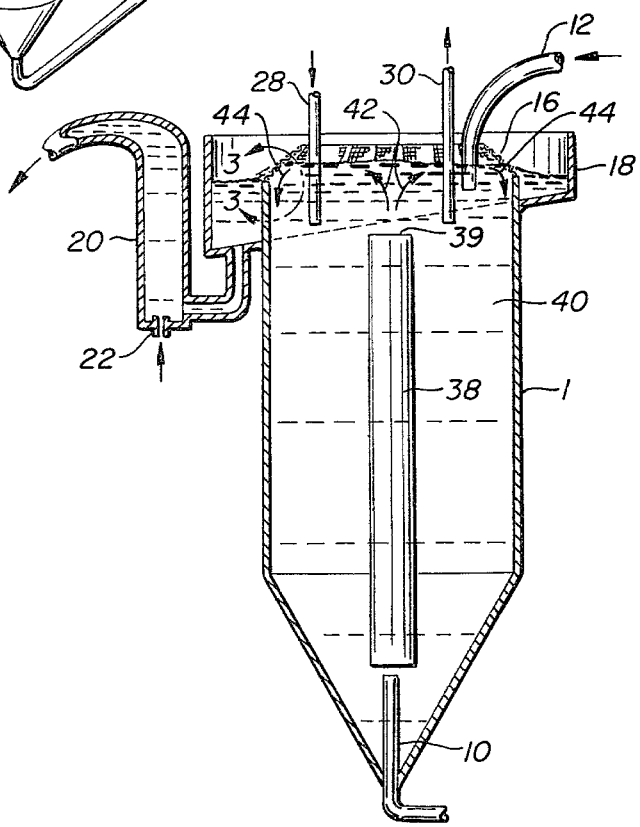
FIG._2.

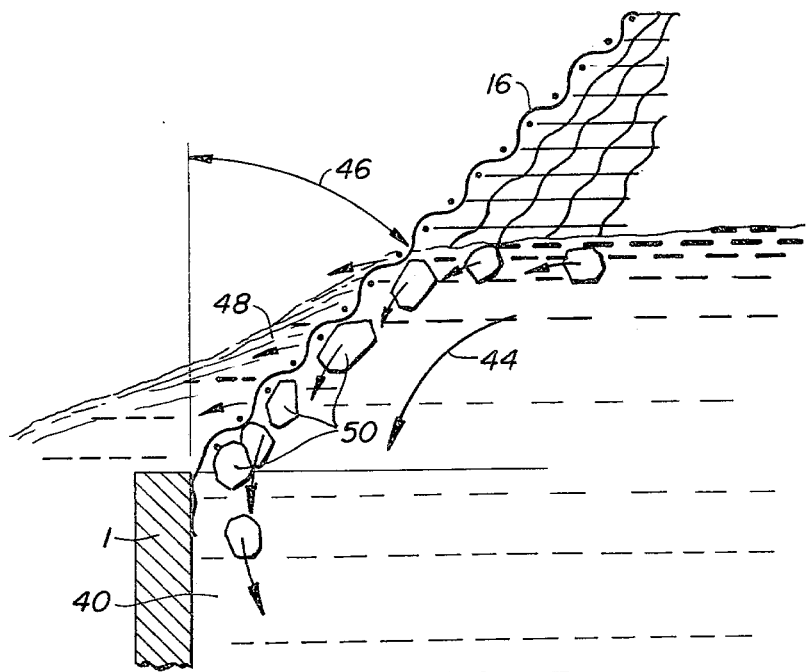
FIG._3.
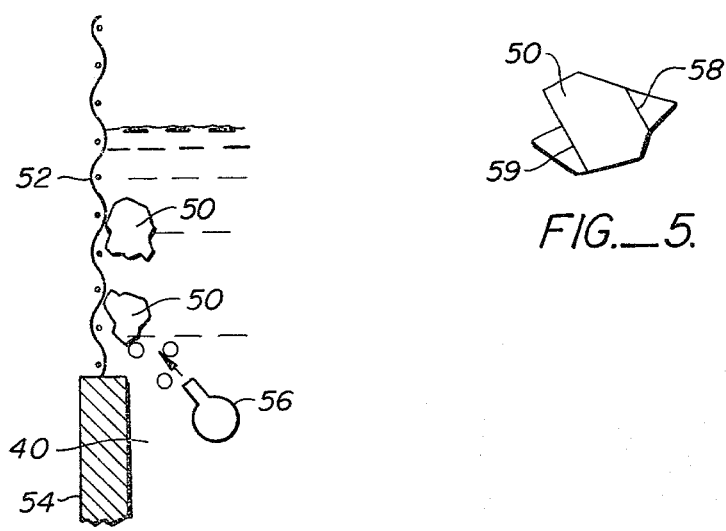
FIG._4.
FIG._5.

INCLINED SEPARATION SCREEN FOR AGITATION TANK

BACKGROUND OF THE INVENTION

The present invention relates to separation screens used with mechanically or pneumatically agitated tanks such as propeller or pachuca tanks.

Precious metals such as gold and silver are contained in an ore material when mined. Precious metal ores are commonly processed by grinding them into small particles, and placing them in a solution which dissolves the precious metals so that they can be separated from the ore. Typically, an aqueous and alkaline cyanide solution is used so that the metals form alkaline cyanide metal complexes in a water solution.

The most common method of separating the metal-containing solution from the ore simply involves filtering the solution from the ore, or separating the solution by countercurrent decantation in a series of thickeners. A relatively new method of recovering precious metals from ores is called the "carbon-in pulp" system and bypasses the liquid-solid separation step by mixing activated charcoal directly with the pulp of ore in cyanide solution. The charcoal or carbon remains in contact with the pulp for a sufficient time to adsorb the gold and silver and is then separated from the worthless residue, called tailings, by a screening process. The charcoal particles are larger than the ore particles which permits the screening step to be accomplished with ease.

A carbon-in-pulp system utilizes a series of mechanically or pneumatically agitated tanks in series, usually 4 to 6. Each tank generally contains a different amount of charcoal, the first tank having the most charcoal and the last tank having the least. Pulp, i.e., the finely ground ore and the alkaline cyanide metal complex solution, is introduced into the first tank. The pulp is agitated with the charcoal in the tank by imparting an upward rolling motion to the mixture outwardly from the center of the tank to its periphery and then down the sides of the tank. The charcoal adsorbs the cyanide metal complex as the pulp is agitated. The pulp is sequentially passed through the series of pneumatically or mechanically agitated tanks so that most of the cyanide metal complex is adsorbed by the charcoal.

Passage of the pulp material through the series of agitated tanks is controlled in many systems by vibrating screens mounted over the tanks, and in other systems by stationary vertical peripheral screens attached to the outer top edges of the tanks. The charcoal particles are sufficiently large so that they do not pass through the screens, and are retained in each tank. The ore is sufficiently finely ground so that the pulp passes through the screens and on to the next downstream tank in series. After passing through the series of tanks, the processed pulp tailings are discarded.

The charcoal containing the adsorbed cyanide metal complex is sequenced through the tanks in reverse order from the ore pulp, new charcoal being added at the final tank. After the charcoal has passed completely through the system, it has become "loaded" with the adsorbed metal complex. In a gold refining system the charcoal can adsorb up to 400 or 500 oz. of gold per ton of charcoal. The leaded charcoal is then chemically processed to remove most of the metal, and after such chemical processing, the "stripped" carbon still contains about 5 oz. of gold per ton of charcoal in a typical gold refining system. The stripped charcoal is then reactivated by heating in an absence of air and returned to the carbon-in-pulp system.

The carbon-in-pulp processing system described above is quite efficient in recovering the precious metals. However, the system relies on the assumption that the charcoal containing the adsorbed metal does not pass through the vibrating or vertical peripheral screens. If a charcoal particle is sufficiently small to pass through the screens, it will be passed completely through all the tanks and lost in the tailings.

The charcoal particles used in the carbon-in-pulp system are carefully sized before entering so that they will be too large to pass through the screens. However, during the operation of the system charcoal particles can become abraded or broken. If the charcoal particles are abraded or broken so as to be sufficiently small to pass through the screens, the precious metal on such charcoal particles is lost in the tailings.

A principal source of abrasion and breakage of the charcoal particles is the abrasion of the charcoal against the screens. Because of the rapid abrasion of carbon by vibrating screens, fixed peripheral screens have been mounted on the upper rim of the agitated tanks. Such screens now in use are vertical but because the flow of pulp holds the larger carbon particles against the screens, thus "blinding" them, air jets are typically used to remove the carbon particles and keep the screen open to the flow of pulp.

The air jets cause intense agitation of the particles against the screens, abrading the edges of the charcoal particles so that eventually the particles may be rendered sufficiently small to pass through the screens. The loss of charcoal from this and other sources of abrasion, even in the best designed systems, is typically about 0.1 lb. or more of charcoal per ton or ore. Some systems use as much as 0.5 lb. charcoal per ton of ore treated. For a typical gold processing system, this can result in the loss of thousands of dollars per day in adsorbed gold discarded with the tailings.

SUMMARY OF THE INVENTION

The present invention provides an improvement in the peripheral screen at the rim of the agitated tank. A screen substantially impermeable to the charcoal particles is provided which is inclined inwardly at an angle between about 35° and 55° from vertical. Charcoal adhering to the screen is readily washed from the screen by the rolling motion of the pulp in the tank. Active flushing systems, such as the air jets now commonly used, are not necessary.

By minimizing abrasion of the charcoal against the screen, far less charcoal is reduced in size so that it can pass through the system and be lost in the tailings.

The financial advantages of reducing the amount of gold or silver lost is readily apparent. Moreover, positive cleaning systems such as the air jets typically used are not necessary. Other minor objectives are also achieved, such as reduced abrasion of the screens themselves so that they need to be replaced less often, and reduced frequency of actively cleaning the screens by, for instance, washing them with high pressure water jets.

While the angle of inclination of the screen can be between about 35 and 55 degrees from vertical, an angle of about 45° from the vertical is preferred. If the angle of inclination from vertical is too small, the flushing action of the present invention is not achieved. If the angle of inclination from the vertical is too large, the pulp material will not readily flow through the screen.

The novel features characteristic of the invention, as the organization and method of operation, together with the further objects and advantages thereof, will be better understood from the following description and the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a series of pneumatically agitated tanks utilizing the screen construction of the present invention;

FIG. 2 is a sectional elevation view of one of the agitated tanks of FIG. 1;

FIG. 3 is an enlarged fragmentary view taken along lines 3—3 of FIG. 2;

FIG. 4 is a fragmentary sectional view of a prior art vertical peripheral screen; and FIG. 5 is a schematic view of the chipping of a charcoal particle caused by the prior art system of FIG. 4.

DESCRIPTION OF THE PREFERRED EMBODIMENT

A series of pneumatically agitated tanks 1–6, often referred to as "pachuca" tanks, is illustrated by way of reference to FIG. 1. A main air supply line 10 feeds the bottom of each of the pachuca tanks 1–6 and causes agitation of the tank contents as will be described below. This agitation can also be supplied by a motor driven propeller.

Pulp consisting of a combination of finely ground ore and a leaching solution is continuously fed into tank 1 through pipe 12, as illustrated by arrow 14 in FIG. 1, and passes through tanks 1–6 in series as described below. The leaching solution includes precious metal dissolved from the ore in the form of an alkaline metal cyanide complex. Each tank 1–6 contains a selected amount of activated charcoal particles, usually calcined coconut shells, which adsorb the metal cyanide complex and take it out of solution.

The finely ground ore in the pulp entering tank 1 and passing through remaining tanks 2–6 has previously been screened on a 48 mesh screen so that all of the ore particles are able to pass through a screen with larger openings. The mesh is defined as openings per inch, and accordingly, the higher the mesh number, the smaller the openings.

The charcoal particles within each tank 1–6 have been previously sized so that no charcoal particle is sufficiently small to pass through a fixed mesh screen. Typically, the charcoal particles lie between 12 and 20 mesh, generally referred to as 12×20 mesh particles, and are larger than the ore particles.

Separation screens 16 in FIG. 1, which will be described in more detail hereinafter, circumscribe or partially circumscribe the upper rims of tanks 1–6. Screens 16 have a mesh size which allows free passage of the pulp therethrough, but are impermeable to the charcoal particles. Since pulp is continuously fed into tank 1 through conduit 12 and through remaining tanks 2–6, the pulp material and entrained charcoal maintains a level at or above the rim of the tank, passes through screens 16, and is collected in launders 18. The charcoal and adsorbed metal are retained in each tank by screens 16.

Pulp material collected in each launder 18 is transferred to the next tank in series through conduit 20. A supply of forced air 22 (see FIG. 2) can be used to lift the collected pulp into the next tank. Alternatively, tanks 1–6 can be stepped in elevation, and gravity alone may be used to transfer the pulp material if desired, forced air 22 being rendered unnecessary.

Fresh activated charcoal is introduced into the system at the last tank 6 through conduit 24, as illustrated by arrow 26 in FIG. 1. Charcoal is not introduced continuously, but rather periodically, such as once a day. When loaded charcoal and pulp have been removed from tank No. 1 through conduit 30, by use of an air lift, the amount of charcoal within tank 1 is maintained constant by transferring pulp and entrained charcoal through conduit 28 from tank 2 to tank 1 also by use of an air lift. Since the pulp transferred merely overflows pachuca tank 1 and flows back into tank 2, the net result is that only charcoal is transferred to pachuca tank 1. All the charcoal is transferred up the line in this fashion through all of the tanks, eventually reaching tank 1 from which it is extracted through conduit 30 as illustrated by arrow 32. The charcoal from tank 2 containing the adsorbed metal complex is then separated from its accompanying ore pulp on a vibrating screen and processed chemically to obtain the pure metal. The pulp separated from the carbon by screening is returned to tank 1. After chemical processing, the charcoal is reactivated and returned to tank 6.

After the pulp passes through the entire sequence of pachuca tanks 1–6, it is expelled through conduit 34, as illustrated by arrow 36. This processed pulp, called "tailings", has insufficient precious metal to merit further processing and is discarded.

It is apparent from viewing the system of FIG. 1 that the amount of charcoal passing through screens 16 should be minimized to reduce loss of gold and silver. Thus charcoal particles must remain large enough so as to not pass through screens 16 and be lost with their precious metals in the tailings.

The manner in which a pachuca tank, for example, agitates the pulp and charcoal particles within the tank is illustrated in detail by way of reference to FIG. 2, in which pachuca tank 1 is depicted in section. Tank 1 includes a central pipe 38 having an upper terminus 39 below the level of the contents 40 of the tank. Conduit 10 provides a transport medium for the pulp which passes upwardly through pipe 38. This air and pulp mixture is expelled near the top of the tank, and causes a rolling motion as illustrated by arrows 42. This rolling motion can also be supplied by a propellor agitator. The contents 40 of tank 1 thus continually move in a roughly eliptical eddy, outwardly from the center of the tank and downwardly along the sides of the tank, as illustrated by arrows 44.

As illustrated in detail in FIG. 3, the present invention provides a separation screen 16, which is inclined at an angle 46 from vertical of about 45°. Screen 16 comprises a plurality of flat, trapezoidal screen sections forming a continuous screen in combination (FIG. 1). The average angle of inclination of each screen section is substantially 45°.

Screen 16 is typically 28 to 35 mesh. The pulp material 48, including entrained ore particles, readily passes through screen 16. However, charcoal particles 50 are too large to pass through the mesh of the screen, and flow past the screen because of the circular movement of the contents 40 of tank 1, as depicted by arrow 44 in FIG. 1. Charcoal particles 50 contact screen 16 at a grazing angle, thus reducing the abrasion of the charcoal particles against the screen.

Although an angle of inclination of 45° from the vertical is preferred, angle 46 in FIG. 3 can vary between about 35° and 55° from vertical without departing from the objectives of the present invention. However, if angle 46 is smaller than about 35°, the rolling action of the contents 40 of tank 1, as depicted by arrow 44, will be insufficient to wash the carbon particles 50 from the screen 16, and the screen will eventually become clogged unless active cleaning steps are utilized. An inclination of greater than 55° inhibits the smooth flow of pulp 48 through screen 16, and also interferes with the washing action of the screen by the pulp.

A typical prior art screen system using a vertical screen 52 is illustrated by way of reference to FIG. 4. The rolling motion of the contents 40 of tank 54 is unable to wash charcoal particles 50 off the screen, and the screen eventually becomes clogged. To prevent such clogging, an air jet 56 is used to dislodge charcoal particles 50 from the screen.

The usage of the air jet system of FIG. 4 causes particles 50 to be rubbed against the screen. As illustrated in detail in FIG. 5, carbon particles 50 have an irregular structure. The carbon particles can easily be broken along fracture lines 58, 59, especially in prior art agitation systems such as that depicted in FIG. 4. Such breakage reduces the size of carbon particles 50, allowing some of them to pass through the screen.

As discussed in detail hereinabove, once a carbon particle such as 50 is sufficiently small to pass through screens 16, it passes completely through the system and is lost in the tailings with the precious metals it has adsorbed. The washing motion provided by the pulp on the inclined screen of the present invention, as discussed above, substantially reduces such losses. In prior art systems using vertical screens and air jets for cleaning, or vibrating screens, the loss of precious metal caused by abrasion of the charcoal against the screen is substantial.

While a preferred embodiment of the present invention has been illustrated in detail, it is apparent that modifications and adaptations of that embodiment will occur to those skilled in the art. However, it is to be expressly understood that such modifications and adapatations are within the spirit and scope of the present invention, as set forth in the following claims.

What is claimed is:

1. In an agitated tank in which a mixture of precious metal-adsorbing charcoal and a ground ore pulp is agitated within the tank by imparting a rolling motion to the mixture, the metal-adsorbing charcoal being retained in the tank and the pulp being expelled over the rim of the tank, the improvement comprising a screen substantially impermeable to the charcoal at least partially circumscribing the rim of the tank and inclined inwardly at an angle of between about 35° and 55° from vertical so that the metal-adsorbing charcoal is washed from the screen by the rolling motion of the mixture in the tank and abrasion of the charcoal against the screen causing loss of charcoal is minimized.

2. The agitation tank of claim 1 wherein the screen is inclined inwardly at an angle of substantially 45° from vertical.

3. The agitation tank of claim 1 wherein the screen comprises a plurality of trapezoidal screen sections, each of which is inclined inwardly at an angle of between about 35° and 55° from vertical.

4. The agitation tank of claim 1 wherein the screens are approximately 28 mesh, the charcoal is substantially 12×20 mesh, and the ore in the pulp is no larger than 48 mesh.

5. The agitation tank of claim 1 wherein agitation is provided solely by forced air 6. The agitation tank of claim 1 wherein the tank is a pachuca tank.

7. In an agitated tank in which a mixture of precious metal-adsorbing charcoal and a ground ore pulp is agitated within the tank by imparting a rolling motion to the mixture, the charcoal being retained in the tank and the pulp being expelled over the rim of the tank, the improvement comprising a plurality of screen sections joined together to form a continuous screen substantially impermeable to the charcoal and at least partially circumscribing the rim of the tank, each screen section being inclined inwardly at an angle of between about 35° and 55° from vertical, so that the metal-adsorbing charcoal is washed from the screen by the rolling motion of the mixture in the tank and abrasion of the charcoal against the screen causing loss of the metal-adsorbing charcoal is minimized.

8. In claim 7 wherein each screen section is inclined inwardly at an angle of substantially 45° from vertical.

9. In claim 7 wherein the screens of each section are approximately 28 mesh, the charcoal is substantially 12×20 mesh, and the pulp is no larger than 28 mesh.

10. In claim 7 wherein the screen sections are flat, trapezoidal screen sections.

11. In claim 1 or 7 wherein the ground ore pulp includes gold ore.

12. In claim 1 or 7 wherein the ground ore pulp includes silver ore.